R. V. L. HARTLEY.
OSCILLATION GENERATOR.
APPLICATION FILED JUNE 1, 1915.
1,356,763.
Patented Oct. 26, 1920.
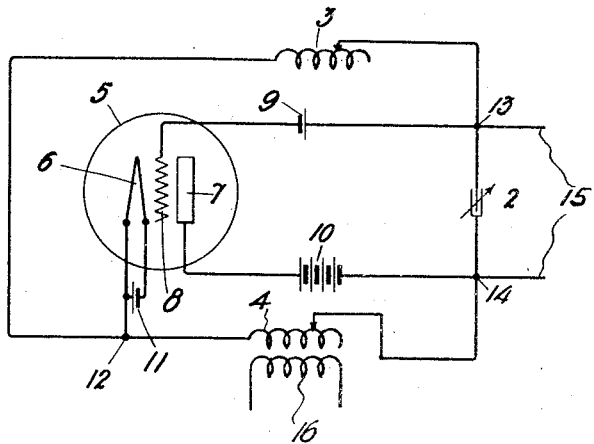
Witnesses:
O. D. M. Enth
John Waldheim
Inventor:
Ralph V. L. Hartley.
by A. C. Sunnei, Atty

UNITED STATES PATENT OFFICE.

RALPH VINTON LYON HARTLEY, OF NEW YORK, N. Y., ASSIGNOR, BY MESNE ASSIGNMENTS, TO WESTERN ELECTRIC COMPANY, INCORPORATED, A CORPORATION OF NEW YORK.

OSCILLATION-GENERATOR.

1,356,763.      Specification of Letters Patent.      Patented Oct. 26, 1920.

Application filed June 1, 1915. Serial No. 31,476.

*To all whom it may concern:*

Be it known that I, RALPH VINTON LYON HARTLEY, a citizen of the United States, residing at New York, in the county of New York and State of New York, have invented certain new and useful Improvements in Oscillation-Generators, of which the following is a full, clear, concise, and exact description.

This invention relates to alternating current generators and more particularly to the combination of an oscillatory circuit with means for supplying increments of energy thereto for the purpose of producing sustained oscillations.

It is a well-known principle of physics that if a charged condenser be discharged through an inductive circuit, such discharge will, under certain conditions of adjustment, be oscillatory in nature and of a period determined by the electrical constants of the circuit. The amplitude of the discharge current wave will be of successively decreasing value due to the damping of the circuit. If a means is provided for adding increments of energy to the circuit in synchronism with its natural oscillations, whether this means be controlled outside said circuit or controlled directly by said circuit, it is possible to neutralize the damping of the circuit; that is, to prevent the diminution in amplitude of succeeding waves and to produce in the circuit an undamped train of oscillations; that is, an alternating current of constant amplitude and of a frequency depending upon the electrical constants of the oscillatory circuit.

This invention provides a generator of the second type mentioned, namely one whose energy supplying agent is directly controlled by the oscillations in the oscillatory circuit.

More specifically this invention makes use of a phenomenon occurring in the action of a thermionic vacuum tube repeater of the type commonly spoken of as the audion. In this type of device a cathode is employed which is capable of producing a pure thermionic stream to an anode or plate electrode which is maintained positive with respect to the cathode by means of an external electro-motive force. A third electrode or grid is located in the path of this thermionic stream or adjacent thereto and serves to control the magnitude of this stream. The grid typifies any control element operating to act electrostatically and thereby control the electron stream or discharge.

If this third electrode be made increasingly negative, the plate electrode will become increasingly positive and conversely, if the grid electrode be made decreasingly negative, the plate electrode will become decreasingly positive. In each instance the change in anode potential will be greater in amplitude than the change in the grid potential. In this invention use is made of this principle by connecting the grid and anode members to the opposite terminals of a condenser located in an oscillatory circuit, so that any change in the charge on the condenser will be productive of a current flow in the vacuum tube repeater, which will be of the proper direction to increase the amplitude of the current momentarily flowing in the oscillatory circuit, thus preventing the damping of the oscillations which would otherwise occur.

A circuit arrangement for producing the result is shown in the accompanying drawing in which condenser 2 and inductances 3 and 4 comprise a circuit electrically tuned to give oscillations of the desired frequency. 5 is a vacuum tube repeater, working on the thermionic principle, including a cathode 6, an anode 7 and an input or grid electrode 8. The grid 8 is connected to one terminal of the condenser 2 through a polarizing battery 9, while the anode 7 is connected to the opposite terminal of the condenser 2 through battery 10. The cathode 6 is heated to incandescence by means of a battery 11 and is connected to a point 12 midway electrically between the two terminals of the condenser 2. An inductance 16 may, as shown, be associated with one of the inductances 3, 4. The operation of the circuit is substantially as follows:

Consider the condenser 2 to be charged in such a way that the terminal 13 is positive and the terminal 14 is negative, and that the battery 9 is of such a value as to maintain the grid 8 always negative with respect to the cathode 6. The presence of a positive charge, therefore, on terminal 13 will tend to decrease the normal negative charge on grid 8 which will have the effect of lessening the electrical obstruction which the grid charge offers to the thermionic stream flowing between cathode 6 and anode 7. The reduction in this obstruction acts in effect like a lowering of the resistance of the path of the thermionic space current and decreases the positive potential of the anode 7 with respect to the cathode 6. This decrease in positive potential will be greater in magnitude than the change in voltage on the grid 8 which occasioned it due to the amplifying effect of the repeater. Therefore, there will be an increase in the negative charge on the terminal 14 of the condenser 2, which will be in phase with the voltage of the oscillations in the oscillatory circuit and this energy will be added to the energy of the latter.

Upon the reversal of current in the oscillatory circuit the opposite action takes place, namely, the terminal 13 now being negative, the grid 8 will become more negative, thereby raising the positive potential of the anode 7 and adding to the energy of the current flowing from the terminal 14 to the terminal 13 through the inductances 4 and 3. Thus oscillatory currents of a frequency which will be dependent upon the constants of the condenser 2 and the inductances 3 and 4 will be set up in the circuit including said condenser and said inductances. Such oscillations will be of constant amplitude due to the increments of energy supplied by the vacuum tube repeater 5 and an undamped electro-motive force will, therefore, be developed between terminals 13 and 14 which may be employed for radio telegraphic or telephonic transmission, or other purposes.

The circuit 6, 7, 10, 4 and 12 may, if desired, be considered the output circuit coupled to the oscillator circuit 12, 3, 2, 4, 12 by means of inductance 4, and the circuit 12, 3, 13, 9, 8 may be considered an input circuit coupled to the said oscillatory circuit by means of inductance 3. The capacity 2 is in shunt to the inductances 3 and 4 with respect to the input and output circuits.

An output transmission or utilization circuit may if desired be linked with one or both of the inductances 3 and 4, although this is not by any means essential. The modification in which such an output circuit is linked with both the inductances 3 and 4 is disclosed and claimed in my co-pending application, Serial No. 225,808, filed March 30, 1918. In the modification shown in the present application the inductances 4 and 16 may function as a transformer to transfer the oscillatory energy to a circuit of transmission or utilization. If desired, however, the energy may be taken from leads 15. It is obvious that coil 16 may be coupled to coil 3 rather than to coil 4.

One advantage of the circuit arrangement shown lies in the parallel relation of the capacity 2 of the oscillatory circuit and that formed by the anode 7 and the grid or the impedance varying element 8. The latter capacity is ordinarily small as compared with the former, but greater than that formed by the filament 6 and grid 8. By this parallel arrangement the principal capacity of the tube 5 forms with that of the oscillatory circuit a single capacity and does not therefore combine with the inductance to form a secondary oscillatory circuit in which might be set up oscillations having a period different than that of the oscillations it is desired to generate.

What is claimed is:

1. Means for generating oscillations comprising an electric discharge device having a cathode, an anode and an impedance-varying element, an oscillatory circuit, and leads from said anode and from said impedance-varying element respectively to points in said oscillatory circuit, the difference in potential between said points being alternately large and small, the reactance of said lead from said impedance-varying element being negligible in determining the period of oscillations generated.

2. Means for generating oscillations comprising an oscillatory circuit, a discharge device having a cathode, an anode and an impedance-varying element, leads from said anode and from said impedance-varying element respectively to points in said oscillatory circuit, the difference in potential between said points being alternately large and small, and a lead from said cathode to a point in said oscillatory circuit having a potential which is at all times between the potentials of said first-mentioned points.

3. Means for generating oscillations comprising a space discharge device having a cathode, an anode and a discharge controlling element, a frequency determining circuit containing portions having capacitative and inductive reactance respectively, leads from said cathode, anode and element to said circuit, each point of connection of said leads to said circuit being separated from the others by a portion of said circuit of substantial reactance.

4. Means for generating oscillations comprising an oscillatory circuit, a discharge device having an anode, a cathode, and an impedance-varying element, said oscillatory circuit containing a capacity, and leads from said anode and said impedance-varying element respectively to opposite sides of said capacity, the reactance of said leads being negligible in determining the period of oscillations generated.

5. Means for generating oscillations comprising an inductance, a discharge device having an anode, a cathode and an impedance-varying element, a lead from said cathode to a point in said inductance, a lead from said anode to said inductance, a lead from said impedance-varying element to said inductance, and an electric capacity in effective shunt to at least a portion of said inductance, including at least a portion of that part of said inductance which lies between the leads from said cathode and said anode.

6. Means for generating oscillations comprising a vacuum device having an anode, a cathode and an impedance-varying element, a coupling reactance, a lead from said cathode to a point in said coupling reactance, a lead from said anode to said coupling reactance, a lead from said impedance-varying element to said coupling reactance, and a second reactance opposite in kind to said coupling reactance and in effective shunt to at least a portion of said coupling reactance, said portion including at least a part of the coupling reactance which lies between the leads thereto from said anode and said cathode.

7. The combination with an oscillatory circuit comprising an inductance and a condenser in series, of a thermionic repeater having a cathode, an anode and a control electrode, a connection including a primary source of electromotive force between said anode and one terminal of said condenser, and a connection including another primary source of electromotive force between said control electrode and the other terminal of said condenser.

8. Means for generating oscillations comprising a vacuum device having a cathode, an anode and an impedance-varying element, an oscillatory circuit containing a capacity and leads from said anode and said impedance-varying element to the opposite sides of said capacity respectively, and a lead from said cathode to said oscillatory circuit, the reactance of said leads being negligible in determining the period of oscillations generated.

9. Means for generating oscillations comprising an oscillatory circuit, a discharge device having a cathode, an anode and a discharge controlling element, leads from said anode and from said element respectively to points in said oscillatory circuit, the difference in potential between said points being alternately large and small, a lead from said cathode to a point in said oscillatory circuit having a potential which is at all times between the potential of said first-mentioned points, and means for normally maintaining said element at an average potential negative with respect to said cathode.

10. Means for generating and utilizing oscillations comprising an inductance, a discharge device having an anode, a cathode, and a discharge controlling element, a lead from said cathode to a point in said inductance, a lead from said anode to said inductance, a lead from said element to said inductance, an electric capacity in effective shunt to at least a portion of said inductance including at least a portion of that part of said inductance which lies between the leads from said cathode and said anode, and a work circuit connected across at least a portion of said capacity.

11. Means for generating oscillations comprising a discharge device having a cathode, an anode, and an impedance varying element, an oscillatory circuit containing portions having capacitative and inductive reactances respectively, and leads from said cathode, anode and element to said circuit, said leads from said cathode and said element being substantially inductionless.

12. An oscillation generator comprising a discharge device, input and output circuits for said device, elements determining the frequency of the oscillations generated, at least one of said elements being included in said input circuit, said circuits being so related that changes in the magnetic field surrounding one thereof cause only immaterial electromotive forces to be induced in the other, and means for supplying to said input circuit a portion of the alternating current energy existing in said output circuit.

13. An oscillation generator comprising a discharge device, an input circuit, an output circuit and an oscillatory circuit for said device, said oscillatory circuit including a plurality of self-inductive portions, one of said portions being in said input circuit and another of said portions being in said output circuit, said portions being so placed with relation to each other that changes of current in one have a negligible inductive effect upon the other.

14. Means for generating oscillations comprising a discharge device having a cathode, an anode and an impedance varying element, an input circuit and an output circuit for said device, an inductance in said input circuit, an inductance in said output circuit, capacity means in parallel circuit relation to at least a portion of said inductance including at least a portion of said inductance of said output circuit, said capacity means and the inductance in parallel relation thereto forming the principal means for determining the period of oscillations generated.

15. Means for generating oscillations and transmitting them to a work circuit, comprising an inductance, a discharge device having an anode, a cathode and an impedance varying element, a lead from said cathode to a point in said inductance, a lead from said anode to said inductance, a lead from said impedance varying element to said inductance, and an electric capacity in effective shunt to at least a portion of said inductance including at least a portion of that part of said inductance which lies between the leads from said cathode and said anode.

16. An oscillation generator comprising a discharge device having as elements a cathode, an anode and an impedance varying element, a frequency determining circuit having a capacity element, a lead from each extremity of said capacity element to the two elements respectively of said discharge device between which the principal portion of the capacity of said elements of said discharge device resides, and a third lead from the other element to another point in said circuit.

17. Means for generating oscillations comprising a discharge device having a cathode, an anode and an impedance varying element, an oscillatory circuit containing a capacity, and leads from said anode and said impedance varying element to the opposite sides of said capacity respectively, the reactance of said leads to currents of the frequency which is generated being too small to have a material effect upon the oscillatory condition.

18. In an electrical signaling system, an evacuated vessel containing two cold and one hot electrode, a series oscillating circuit connected across said cold electrodes, and a tap connection between said hot electrode and a point on said circuit other than the points of connection to said cold electrodes.

In witness whereof, I hereunto subscribe my name this 29" day of May A. D., 1915.

RALPH VINTON LYON HARTLEY.